United States Patent
Jha et al.

(10) Patent No.: US 11,097,855 B2
(45) Date of Patent: Aug. 24, 2021

(54) AIRCRAFT BEACON LIGHT AND AIRCRAFT COMPRISING AN AIRCRAFT BEACON LIGHT

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 20 days.

(21) Appl. No.: 16/441,548

(22) Filed: Jun. 14, 2019

(65) Prior Publication Data
US 2019/0382132 A1    Dec. 19, 2019

(30) Foreign Application Priority Data
Jun. 19, 2018   (EP) .................................... 18178563

(51) Int. Cl.
| | |
|---|---|
| *B64D 47/06* | (2006.01) |
| *F21V 7/00* | (2006.01) |
| *F21V 7/06* | (2006.01) |
| *F21V 5/04* | (2006.01) |
| *B64D 47/04* | (2006.01) |
| *F21Y 115/10* | (2016.01) |
| *F21W 107/30* | (2018.01) |

(52) U.S. Cl.
CPC ............ *B64D 47/06* (2013.01); *B64D 47/04* (2013.01); *F21V 5/04* (2013.01); *F21V 7/0091* (2013.01); *F21V 7/06* (2013.01); *B64D 2203/00* (2013.01); *F21W 2107/30* (2018.01); *F21Y 2115/10* (2016.08)

(58) Field of Classification Search
CPC .... B64D 47/04; B64D 47/06; B64D 2203/00; F21V 7/0091; F21V 7/06; F21V 5/04; F21Y 2103/33; F21Y 2115/10; F21W 2107/30
USPC .................................................. 250/504 R
See application file for complete search history.

(56) References Cited

U.S. PATENT DOCUMENTS

| | | |
|---|---|---|
| 8,534,867 B1 | 9/2013 | Beadle |
| 9,671,085 B2 | 6/2017 | Brunt, Jr. et al. |
| 2005/0286840 A1 | 12/2005 | Ho et al. |

(Continued)

FOREIGN PATENT DOCUMENTS

| | | |
|---|---|---|
| CN | 102800663 A | 11/2012 |
| EP | 3181459 A1 | 6/2017 |

(Continued)

OTHER PUBLICATIONS

Extended European Search Report for International Application No. 18178563.5 dated Oct. 2, 2018, 7 pages.

*Primary Examiner* — Kiet T Nguyen
(74) *Attorney, Agent, or Firm* — Cantor Colburn LLP (57) ABSTRACT

An aircraft beacon light includes a mounting plate having a central portion; a plurality of light sources arranged on the mounting plate around the central portion and facing away from the mounting plate; and a lens structure arranged over the plurality of light sources, wherein the lens structure is configured to reflect a first portion of light emitted by the plurality of light sources laterally outwards via total internal reflection; wherein the aircraft beacon light is configured to emit flashes of red light in operation.

19 Claims, 5 Drawing Sheets

(56) References Cited

U.S. PATENT DOCUMENTS

| | | |
|---|---|---|
| 2009/0219715 A1 | 9/2009 | Peck et al. |
| 2012/0175643 A1 | 7/2012 | West |
| 2013/0128570 A1 | 5/2013 | Jiang |
| 2013/0134445 A1 | 5/2013 | Tarsa et al. |
| 2013/0258699 A1 | 10/2013 | Weaver |
| 2013/0292709 A1 | 11/2013 | Tong et al. |
| 2013/0293098 A1* | 11/2013 | Li ................. F21V 3/02 313/512 |
| 2014/0146543 A1 | 5/2014 | Ben Levy |
| 2015/0183525 A1 | 7/2015 | De Jager |
| 2015/0252967 A1* | 9/2015 | Worman ............ F21V 5/006 362/187 |
| 2015/0311402 A1 | 10/2015 | Van De Ven |
| 2016/0013373 A1 | 1/2016 | Bhat et al. |
| 2016/0305629 A1 | 10/2016 | Brunt, Jr. et al. |
| 2017/0116864 A1* | 4/2017 | Zarnowski ............ G08B 5/36 |
| 2017/0181246 A1 | 6/2017 | Hessling-Von Heimendahl et al. |
| 2017/0233101 A1 | 8/2017 | Hessling-Von Heimendahl et al. |
| 2018/0084620 A1* | 3/2018 | Klein .................. H05B 45/14 |
| 2018/0231204 A1* | 8/2018 | Hessling-Von Heimendahl ......... F21S 41/135 |

FOREIGN PATENT DOCUMENTS

| | | |
|---|---|---|
| JP | 2006108640 A | 4/2006 |
| WO | 2006091225 A1 | 8/2006 |
| WO | 2009084049 A1 | 7/2009 |
| WO | 2014141011 A1 | 9/2014 |
| WO | 2016137026 A1 | 9/2016 |

\* cited by examiner

AIRCRAFT BEACON LIGHT AND AIRCRAFT COMPRISING AN AIRCRAFT BEACON LIGHT

FOREIGN PRIORITY

This application claims priority to European Patent Application No. 18178563.5 filed Jun. 19, 2018, the entire contents of which is incorporated herein by reference.

TECHNICAL FIELD

The present invention relates to exterior aircraft lighting. In particular, it relates to an aircraft beacon light and an aircraft equipped therewith.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Common aircraft have two red-flashing beacon lights, arranged on the top of the aircraft fuselage and on the bottom of the aircraft fuselage, respectively. Their red flashes indicate that the engines of the aircraft are turned on. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. Given the large number of exterior aircraft lights, an exterior aircraft lighting system with low maintenance efforts and little impact on the aircraft design is beneficial.

Accordingly, it would be beneficial to provide an exterior aircraft light that has low maintenance requirements and has low impact on the aircraft operation.

SUMMARY

Exemplary embodiments of the invention include an aircraft beacon light, comprising a mounting plate having a central portion; a plurality of light sources arranged on the mounting plate around the central portion and facing away from the mounting plate; and a lens structure arranged over the plurality of light sources, wherein the lens structure is configured to reflect a first portion of light emitted by the plurality of light sources laterally outwards via total internal reflection; wherein the aircraft beacon light is configured to emit flashes of red light in operation.

Exemplary embodiments of the invention allow for the provision of a compact aircraft beacon light with low maintenance requirements. Directing a first portion of light from the plurality of light sources laterally outwards via total internal reflection allows for a desired re-directing of light in a space-efficient manner. The lens structure may be placed in immediate vicinity to the plurality of lights sources and may achieve the re-directing without the need for more extensive reflector structures. Also, using the lens structure and its total internal reflection properties allows for eliminating metallic reflectors, as provided in prior approaches, which keeps the maintenance efforts low. Eliminating metallic reflectors allows for eliminating corrosion and electrolysis in the optically effective components, thus extending the longevity of the aircraft beacon light and reducing the maintenance efforts.

The aircraft beacon light is configured for being mounted to an aircraft. In particular, the aircraft beacon light may be configured for being mounted to a fuselage of an aircraft. Further in particular, the aircraft beacon light may be configured to be mounted to the aircraft in a way that the mounting plate is substantially parallel to the portion of the fuselage to which it is mounted. The aircraft beacon light may be mounted to the aircraft via the mounting plate or via an intermediate support structure, arranged between the aircraft fuselage and the mounting plate.

The aircraft beacon light may further comprise a lens cover arranged over the plurality of light sources and the lens structure. Such a lens cover may protect the plurality of light sources and the lens structure from the adverse operating environment of the aircraft, such as from the aerodynamic forces and from impinging particles during flight.

The lens structure may be a transparent or translucent structure, through which the first portion of light emitted by the plurality of light sources and, potentially, other portions of light emitted by the plurality of light sources pass. The lens structure conditions the light output of the aircraft beacon light. In particular, it may transform the light intensity distribution, as emitted by the plurality of light sources, into an output light intensity distribution, as emitted by the aircraft beacon light. The lens structure may also be referred to as an optics structure.

The lens structure may have a light entry surface and a light exit surface. In particular, said first portion of light emitted by the plurality of light sources may enter the lens structure via the light entry surface, may be reflected via total internal reflection within the lens structure, and may exit the lens structure at the light exit surface.

The lens structure is arranged over the plurality of light sources. The term arranged over relates to an arrangement of the lens structure in the light path of the plurality of light sources. It does not specify a particular orientation of the lens structure within the aircraft frame of reference. Rather, the lens structure may be arranged over the plurality of light sources, when seen from the mounting plate to which the plurality of light sources are mounted. In other words, the lens structure is arranged in the light emission directions of the plurality of light sources.

The lens structure is configured to reflect a first portion of light emitted by the plurality of light sources laterally outwards via total internal reflection. In other words, the lens structure is configured to reflect the first portion of light emitted by the plurality of light sources away from the central portion of the mounting plate. The lens structure being configured to reflect the first portion of light emitted by the plurality of light sources via total internal reflection means that the lens structure is shaped and arranged in such a way with respect to the plurality of light sources that the first portion of light experiences total internal reflection.

The aircraft beacon light may provide illumination that is in conformity with the requirements of Federal Aviation Regulations (FAR) section 25.1401. In particular, the aircraft beacon light may fulfil the FAR requirements of section 25.1401 for one of the two hemispheres towards the top or towards the bottom of an aircraft. In other words, the aircraft beacon light may fulfil the FAR requirements for an upper aircraft beacon light or for a lower aircraft beacon light, i.e. it may fulfil the requirements above the horizontal plane or below the horizontal plane, as laid out in section 25.1401 of the FAR.

The aircraft beacon light may have a main light output plane that is substantially parallel to the mounting plate. The main light output plane may coincide with the horizontal plane, when the aircraft beacon light is mounted to an aircraft. The plurality of light sources may be arranged on the mounting plate with their principal light emission directions substantially orthogonal to the main light output plane. In other words, there may be a substantially 90° angle between the principal light emission directions of the plurality of light sources and the main light output plane of the aircraft beacon light. The term main light output plane of the aircraft beacon light refers to the light output plane of the largest light intensity.

The aircraft beacon light is configured to emit flashes of red light in operation. This wording relates to the perception of the light output by the observer. For example, a person on the airfield, when in the output range of the aircraft beacon light, sees red light flashes emitted by the aircraft beacon light. The plurality of light sources may generate red light. It is also possible that the aircraft beacon light has a red light filter, such that the resulting light flashes, as seen by the observer, are red light flashes, although white light or another spectral composition of light may be originally generated. Reddish light sources and a red light filter may also be combined.

The aircraft beacon light is configured to emit flashes of red light in operation. The term red light encompasses any kind of reddish shade of light. In a particular embodiment, the aircraft beacon light may be configured to emit flashes of aviation red light in operation. The term aviation red refers to a range of shades of red light, particularly well-suited to aircraft operations. The color range of aviation red may for example be as defined in section 25.1397 of the FAR.

The aircraft beacon light is configured to emit flashes of red light in operation. In particular, the aircraft beacon light may have a controller that selectively provides electric power to the plurality of light sources, thus illuminating the plurality of light sources in an intermittent manner, which in turn provides for the emission of red light flashes by the aircraft beacon light in operation. The controller may be coupled to an aircraft on-board power supply network on the one hand and to the plurality of light sources on the other hand.

According to a further embodiment, the lens structure is a unitary structure. In other words, the lens structure may be a single lens body arranged over the plurality of light sources. In particular, the lens structure may be a unitary, substantially angular structure. In this way, the lens structure may be conveniently arranged over the plurality of light sources, which are arranged around the central portion of the mounting plate. In the alternative, the lens structure may be comprised of two or more separate lenses, with each of the separate lenses being arranged over one or more of the plurality of light sources.

According to a further embodiment, the lens structure is made from silicone. Making the lens structure from silicone allows for the provision of a lens structure that has low sensitivity to the demanding operating environment of an aircraft. In particular, silicones are suitable for withstanding aggressive chemicals that may be present in the aircraft environment in the course of de-icing or due to exhaust from the jet engines. Also, silicones allow for providing the desired optical effects without problems of corrosion. Yet further, the lens structure may be molded from silicone in a convenient manner.

According to a further embodiment, the lens structure comprises a first total internal reflection surface configured to reflect the first portion of light emitted by the plurality of light sources laterally outwards via total internal reflection, wherein the first total internal reflection surface is positioned laterally outwards of the plurality of light sources. In particular, the first portion of light emitted by the plurality of light sources may enter the lens structure at a light entry surface, experience total internal reflection at the first total internal reflection surface, and exit the lens structure at alight exit surface. With the first total internal reflection surface being positioned laterally outwards of the plurality of light sources, the first portion of light may be re-directed in the desired manner with a single reflection, thus keeping the space envelope of the aircraft beacon light small and yielding high efficiency in light re-direction.

According to a further embodiment, the first total internal reflection surface covers an angular range of between 30° and 60°, in particular of between 40° and 50°, when seen from the plurality of light sources in cross-section. Said cross-section may refer to a cross-section through the aircraft beacon light orthogonal to the mounting plate and running through the central portion thereof. With the first total internal reflection surface covering an angular range of between 30° and 60°, in particular of between 40° and 50°, a very substantial portion of light from the plurality of light sources may be collimated and re-directed in a desired manner via total internal reflection. In this way, an overall high light efficiency may be achieved.

According to a further embodiment, the first total internal reflection surface is substantially parabolic in cross-section. With a substantially parabolic cross-section, a high degree of collimation and a high peak intensity in the main light output plane or around the main light output plane may be achieved.

According to a further embodiment, the lens structure is configured to collimate the first portion of light emitted by the plurality of light sources within an angular range of less than 10° with respect to the mounting plate, in particular of less than 5° with respect to the mounting plate. In particular, the lens structure may by configured to collimate the first portion of light within an angular range of +/−10° with respect to the mounting plate, in particular within an angular range of +/−5° with respect to the mounting plate. It is also possible that the lens structure is configured to collimate the first portion of light in an angular range of between 0° and 10°, in particular of between 0° and 5°, with respect to the mounting plate. This opening angle of 10° or 5° may be provided on the side of the mounting plate that supports the plurality of light sources. In this way, the first portion of light is collimated in an angular range that requires high light intensity in accordance with the FAR requirements.

According to a further embodiment, the lens structure is configured to reflect a second portion of light emitted by the plurality of light sources laterally inwards via total internal reflection.

According to a further embodiment, the lens structure comprises a second total internal reflection surface configured to reflect a second portion of light emitted by the plurality of light sources laterally inwards via total internal reflection, wherein the second total internal reflection surface is positioned laterally inwards of the plurality of light sources. In this way, an additional portion of the light emitted by the plurality of light sources is efficiently re-directed via total internal reflection in a desired manner within a small space envelope. In particular, it may be achieved that not only the first portion of light of the plurality of light sources, which is somewhat directed outwards when leaving the plurality of first sources, but also the second portion of light, which is directed somewhat inwards when leaving the plurality of first light sources, is efficiently used for the overall light output of the aircraft beacon light.

According to a further embodiment, the second total internal reflection surface is configured to direct the second portion of light past the central portion of the mounting plate. In other words, the second total internal reflection surface is configured to reflect the second portion of light towards the central portion of the mounting plate or generally towards the other side of the lens structure, in case the lens structure has a generally annular structure. Further, the second total internal reflection surface may be configured to direct the second portion of light past the lens structure or towards a refractive portion of the lens structure or partly past the lens structure and partly towards a refractive portion of the lens structure. The refractive portion of the lens structure may be provided to perform additional conditioning of the second portion of light or of some of the second portion of light for contributing to an efficient satisfaction of the FAR requirements for aircraft beacon lights.

According to a further embodiment, the plurality of light sources are arranged on the mounting plate in a substantially rotationally symmetric manner. Accordingly, the plurality of light sources may be arranged along a circular outline around the central portion of the mounting plate. In addition or alternatively, the lens structure may be a substantially rotationally symmetric lens structure. The arrangement of the plurality of light sources and/or the lens structure may be rotationally symmetric with respect to an axis through the central portion of the mounting plate, in particular with respect to an axis orthogonal to the central portion of the mounting plate. Such a rotationally symmetric design is particularly suitable for fulfilling the FAR requirements for aircraft beacon lights, which apply to a 360° angle.

According to a further embodiment, the aircraft beacon light further comprises a lens cover arranged over the plurality of light sources and the lens structure, wherein the light paths from the plurality of light sources to the lens cover are free of metallic reflectors. In this way, no structures that are sensitive to corrosion and/or electrolysis are provided in the light paths from the plurality of light sources to the lens cover, such that the optically effective components of the aircraft beacon light may be long-lasting and may require little maintenance.

According to a further embodiment, the plurality of light sources comprise a plurality of red light sources. In particular, the plurality of light sources may comprise a plurality of red LEDs. In addition or alternatively, one or more red light filters may be provided in the aircraft beacon light for providing a red light output. For example, above mentioned lens cover may form a red light filter.

According to a further embodiment, the plurality of light sources comprise a plurality of infrared light sources, such as infrared LEDs. The provision of infrared light sources may allow for providing the desired beacon light functionality in covert operations as well. In particular, the red light sources and infrared light sources may be arranged in an alternating or otherwise patterned manner around the central portion of the mounting plate.

According to a further embodiment, the lens structure is overmolded over the plurality of light sources. In this way, a particularly dense and compact implementation of the aircraft beacon light may be achieved. Also, overmolding the lens structure over the plurality of light sources may allow for a low number of optical boundary surfaces, thus helping the overall efficiency of the aircraft beacon light. Further, overmolding the lens structure over the plurality of light sources allows for the provision of a mechanically strong attachment between the mounting plate, the light sources and the lens structure.

Exemplary embodiments of the invention further include an aircraft comprising at least one aircraft beacon light, as described in any of the embodiments above. The additional features, modifications, and beneficial effects, as described above with respect to the exemplary embodiments of the aircraft beacon light, apply to the aircraft in an analogous manner.

According to a further embodiment, the aircraft comprises an upper aircraft beacon light, as described in any of the embodiments above, mounted to a top portion of the fuselage of the aircraft, and a lower aircraft beacon light, as described in any of the embodiments above, mounted to a bottom portion of the fuselage of the aircraft. For each of the upper aircraft beacon light and the lower aircraft beacon light, the mounting may be done in a way that the mounting plate is arranged towards the fuselage, i.e. that the mounting plate is arranged between the fuselage on the one side and the light sources and lens structure on the other side.

BRIEF DESCRIPTION OF FIGURES

Further exemplary embodiments of the invention will be described below with respect to the accompanying drawings, wherein.

DETAILED DESCRIPTION

Figure 1:
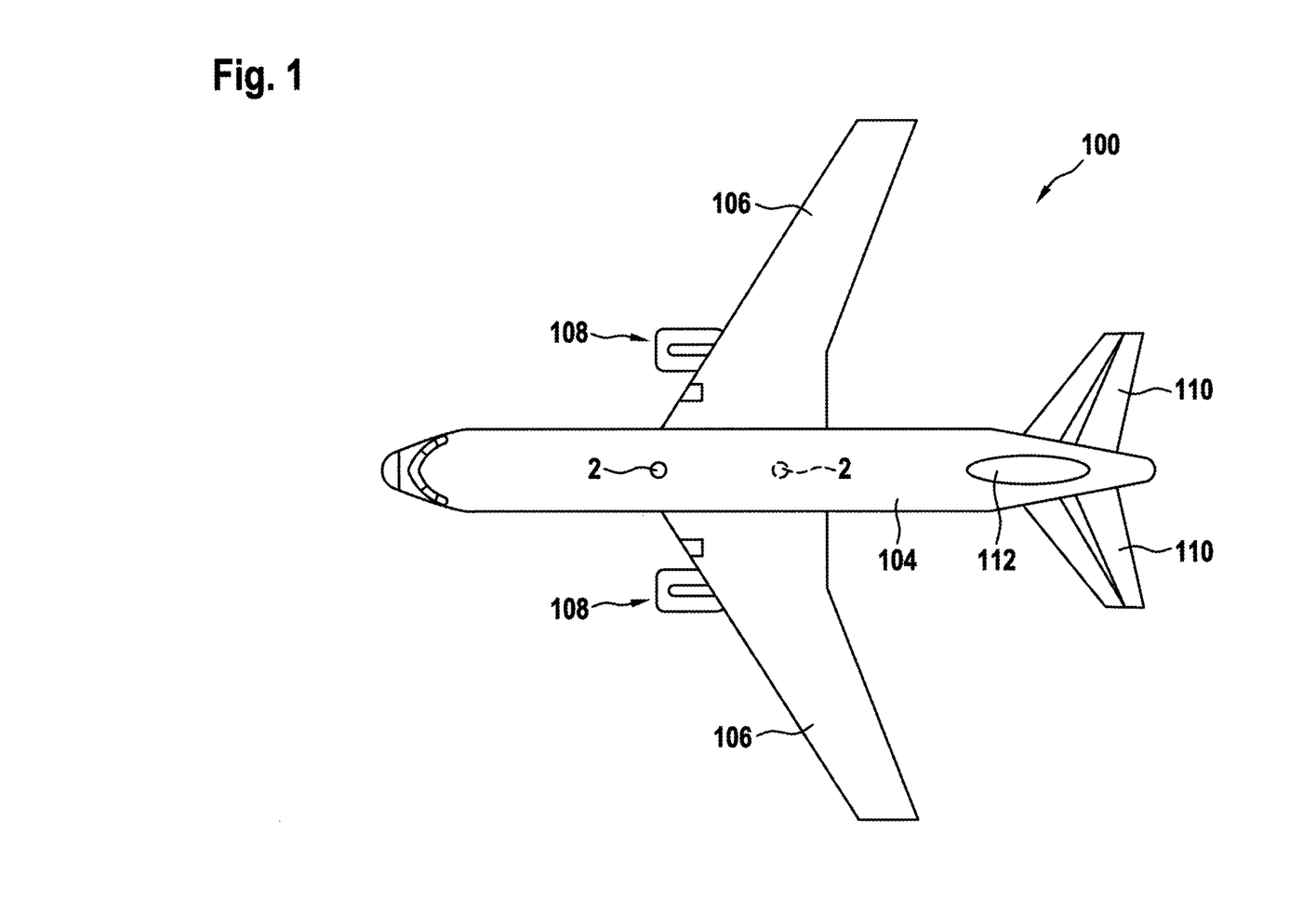
FIG. 1 shows an aircraft in accordance with an exemplary embodiment of the invention, equipped with two aircraft beacon lights in accordance with exemplary embodiments of the invention, in a schematic top view.

FIG. 1 shows an aircraft 100 in accordance with an exemplary embodiment of the invention. The aircraft 100 of FIG. 1 is an airplane, in particular a large commercial passenger or cargo air plane. It is pointed out that other types of aircraft may also be implemented in accordance with exemplary embodiments of the present invention.

The aircraft 100 has a fuselage 104. Two wings 106 are attached to the right and to the left of the fuselage 104. Each of the wings 106 carries a respective engine 108. Further, two horizontal stabilizers 110 and a vertical stabilizer 112 are mounted to a tail portion of the fuselage 104. Again, it is pointed out that aircraft in accordance with other designs and constructions are encompassed by exemplary embodiments of the present invention.

The aircraft 100 comprises two aircraft beacon lights 2, mounted to the fuselage 104. An upper aircraft beacon light 2 is mounted to a top portion of the fuselage 104 and is depicted with a solid circle in FIG. 1. A lower aircraft beacon light 2 is mounted to a bottom portion of the fuselage 104 and is depicted with a dashed circle in FIG. 1. The upper and lower aircraft beacon lights 2 are in accordance with exemplary embodiments of the invention, the details of which will be described in detail below with reference to FIGS. 3 to 7. In operation, the aircraft beacon lights 2 emit flashes of reddish light, in order to provide for the beacon light behaviour, as expected by other aircraft, ground personnel and air space control. In particular, the aircraft beacon light 2 may emit flashes of aviation red light.

Figure 2:
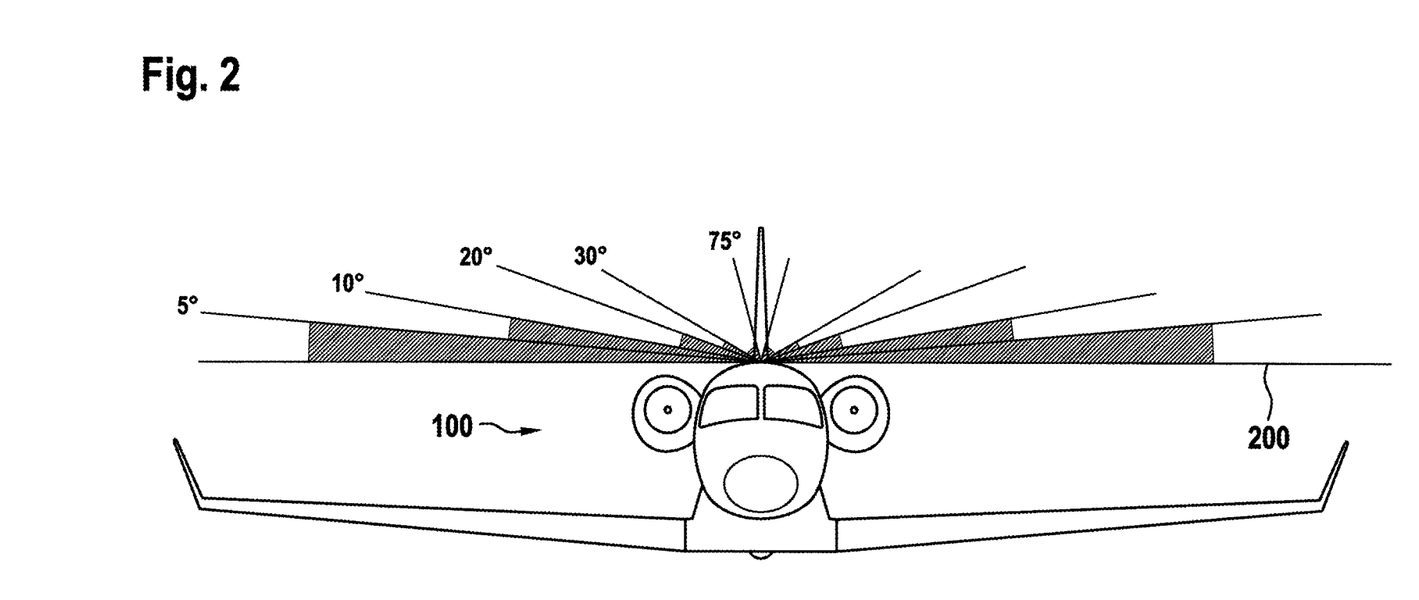
FIG. 2 illustrates the FAR requirements for aircraft beacon lights in an aircraft frame of reference, with an exemplary aircraft being shown in a front view.

FIG. 2 illustrates a light intensity distribution for an upper aircraft beacon light, as required by the Federal Aviation Regulations (FAR), when mounted to the top of an exemplary aircraft 100. In particular, the depicted light intensity distribution reflects the requirements of FAR section 25.1401. The light intensity distribution is shown as an angular distribution with respect to the horizontal plane 200. In particular, it is shown in a vertical cross-sectional plane that is orthogonal to the longitudinal extension of the aircraft fuselage. However, as the FAR requirements are described as a rotationally symmetric distribution, i.e. as a distribution that is identical in all viewing directions from the beacon light, the shown light intensity distribution would look the same in all vertical cross-sections through the center of the upper aircraft beacon light. It is understood that a mirror symmetric light intensity distribution may be required for a lower aircraft beacon light.

The depicted light intensity distribution of FIG. 2 is as follows. A light intensity of 400 cd is required for an angular range of between 0° and 5° with respect to the horizontal plane 200. A light intensity of 240 cd is required in an angular range of between 5° and 10° with respect to the horizontal plane 200. A light intensity of 80 cd is required in an angular range between 10° and 20° with respect to the horizontal plane 200. A light intensity of 40 cd is required in an angular range of between 20° and 30° with respect to the horizontal plane 200. A light intensity of 20 cd is required in an angular range of between 30° and 75° with respect to the horizontal plane 200. Accordingly, the required light intensity values, shown as angular sectors in FIG. 2, represent minimum light intensity values, as spelled out by the FAR. As the horizontal plane 200 is the plane with the highest required light intensity, it can also be referred to as main light output plane.

The exemplary aircraft beacon lights of FIGS. 3 to 7 fulfil the requirements depicted in FIG. 2.

Figure 3:
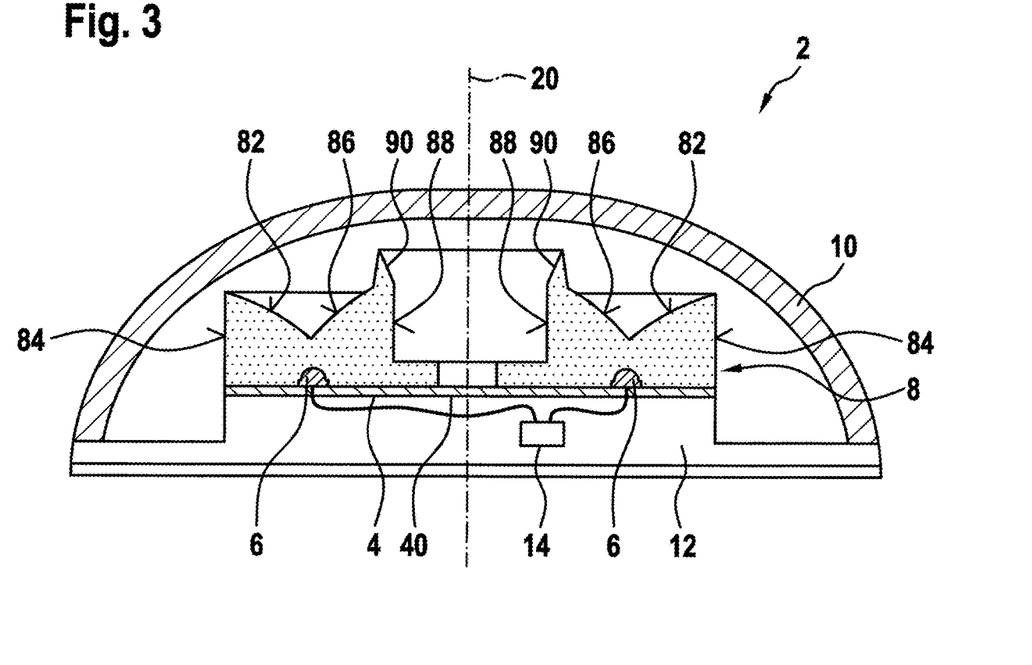
FIG. 3 shows an aircraft beacon light in accordance with an exemplary embodiment of the invention in a cross-sectional view.

FIG. 3 shows an aircraft beacon light 2 in accordance with an exemplary embodiment of the invention. The aircraft beacon light 2 is shown in a cross-sectional view. As the aircraft beacon light 2 is a rotationally symmetric light around an axis of symmetry 20, the cross-sectional view of FIG. 3 may be any vertical cross-sectional view going through the axis of symmetry 20 of the aircraft beacon light 2 and cutting through to light sources. For ease of reference, it is assumed that the depicted cross-sectional view is a lateral vertical cross-sectional view in the aircraft frame of reference, i.e. a vertical cross-sectional view going from the left to the right in the aircraft frame of reference, orthogonal to a forward flight direction of the aircraft.

The aircraft beacon light 2 has a mounting plate 4, which is disk-shaped in the exemplary embodiment of FIG. 3. The mounting plate 4 has a central portion 40, around which a plurality of light sources 6 are arranged. In the exemplary embodiment of FIG. 3, the plurality of light sources 6 are arranged in a circular manner around the central portion 40 of the mounting plate 4. In particular, the plurality of light sources 6 are arranged between the central portion 40 of the mounting plate 4 and the circumferential edge of the mounting plate 4. In the cross-sectional view of FIG. 3, two of the light sources 6 are depicted.

In the exemplary embodiment of FIG. 3, the plurality of light sources 6 are LEDs. In particular, the plurality of light sources 6 are red LEDs. As such, they emit red light in operation, which in turn provides for a red light emission by the aircraft beacon light 2 without the need for additional color filters or similar structures.

The mounting plate 4 is mounted to a support structure 12. The support structure 12 forms the part of the aircraft beacon light 2 that is closest to the aircraft body and that is configured to be mounted to the fuselage of the aircraft. The support structure 12 provides mechanical support to the mounting plate 4 and provides a cooling structure and cooling space for heat transfer away from the light sources 6. A control unit 14 is provided in the support structure 12. The control unit 14 is coupled to the light sources 6 and effects pulsed power supply to the light sources 6 in operation. In this way, the plurality of light sources 6 provide for the red-flashing effect of the aircraft beacon light 2. The control unit 14 may be coupled to an on-board power supply network or to an according power adapter and may pass on the received power to the light sources 6. The control unit 14 may be embodied entirely in hardware or may comprise a suitable combination of hardware and software for achieving the desired control of the light sources 6. It is also possible that the mounting plate 4 is a printed circuit board (PCB) carrying all power connections to the plurality of light sources 6 and according control circuitry.

The aircraft beacon light 2 further comprises a lens structure 8. The lens structure 8 is a unitary, rotationally symmetric lens in the exemplary embodiment of FIG. 3. In other words, a unitary lens structure 8 is arranged within the aircraft beacon light 2 for conditioning the light output of the aircraft beacon light 2. The lens structure 8 is an annular structure that is arranged over the plurality of light sources 6 and on the mounting plate 4 around the central portion 40 thereof. The lens structure 8 is made from silicone and is molded over the plurality of light sources 6 onto the mounting plate 4. In other words, during manufacture, the material of the lens structure 8 may be brought into its eventual shape in a molding process right over the plurality of light sources 6 and the mounting plate 4. It is also possible that the lens structure 8 is molded as a separate element and is attached to the mounting plate 4, enclosing the plurality of light sources 6 between the mounting plate 4 and the lens structure 8.

As the lens structure 8 is a rotationally symmetric component, the cross-sectional view of FIG. 3 shows two mirror-symmetrical portions of the lens structure 8 towards the left and towards the right of the central portion 40 of the mounting plate 4. It is understood that the individual surfaces and portions of the lens structure 8, which will be described below, extend around the central portion 40 of the mounting plate 4 in a revolving manner. It is further understood that the lens structure 8 may also be continuous through the central portion 40 of the mounting plate 4 and may thus cover the whole mounting plate 4.

The lens structure 8 has a light entry surface, which is the boundary surface with the plurality of light sources 6, a first total internal reflection surface 82, which is distal from the mounting plate 4 and positioned laterally outwards of the plurality of light sources 6, a second total internal reflection surface 86, which is distal from the mounting plate 4 and laterally inwards of the plurality of light sources 6, a first light exit surface 84, which is substantially orthogonal to the mounting plate 4 and forms the laterally outermost part of the lens structure 8, and a second light exit surface 88, which is substantially orthogonal to the mounting plate 4 and which is positioned between the plurality of light sources 6 and the central portion 40 of the mounting plate 4, i.e. laterally inwards of the plurality of the light sources 6 and the second total internal reflection surface 86. In addition, the lens structure 8 of the exemplary embodiment of FIG. 3 comprises a refractive portion 90, which forms the most distal part of the lens structure 8 with respect to the mounting plate 4 and which is arranged between the second light exit surface 88 and the second total internal reflection surface 86, when considering the distance from the axis of symmetry 20. The optical operation of those surfaces and portions of the lens structure 8 will be described below with respect to exemplary light rays, as illustrated in FIG. 4.

The aircraft beacon light 2 of FIG. 3 further comprises a lens cover 10. The lens cover 10 is mounted to the support structure 12 and forms an inner space between the support structure 12 and the lens cover 10, in which the mounting plate 4, the plurality of light sources 6 and the lens structure 8 are arranged. The lens cover 10 thus protects the lens structure 8, the plurality of light sources 6, and the mounting plate 4 during flight of the aircraft.

The lens cover 10 may also comprise a red color filter. In this case, the plurality of light sources 6 may be white light sources, such as white LEDs, with the red color filter achieving an emission of red light flashes, as seen by the observer. It is also possible that a red color filter is provided as an additional structure, for example between the lens structure 8 and the lens cover 10 or between the plurality of light sources 6 and the lens structure 8.

Figure 4:
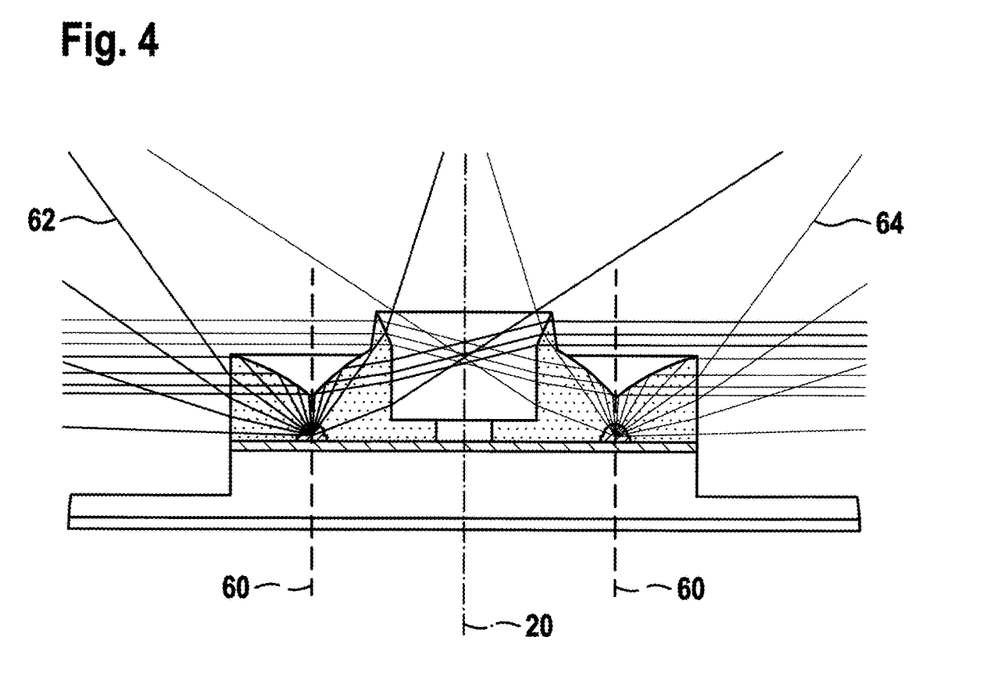
FIG. 4 shows selected components of the aircraft beacon light of FIG. 3 in the same cross-sectional view, illustrating the operation thereof with exemplary light rays.

FIG. 4 shows the support structure 12, the mounting plate 4, the plurality of light sources 6 and the lens structure 8 of the aircraft beacon light 2 of FIG. 3 in the same cross-sectional view. In addition, FIG. 4 shows exemplary light rays 62, as emitted by the light source 6 on the left hand side of FIG. 4, and shows exemplary light rays 64, as emitted by the light source 6 on the right hand side of FIG. 4. In order to draw better attention to the exemplary light rays 62, 64, the reference numerals to the individual surfaces and portions of the lens structure 8 are omitted from FIG. 4. However, it is pointed out that the reference numerals of FIG. 3 apply to FIG. 4 in complete analogy.

For ease of illustration, the principal light emission directions of the light sources 6 are indicated with dashed lines 60 in FIG. 4, which are orthogonal to the mounting plate 4. The light sources 6, which are LEDs in the exemplary embodiment of FIGS. 3 and 4, are directed light sources, having the main emission direction orthogonal to the mounting plate.

A first portion of light, emitted by the light sources 6, enters the lens structure 8 right after exiting the light sources 6, reaches the first total internal reflection surface 82, experiences total internal reflection at the first total internal reflection surface 82 and is reflected laterally outwards. While being reflected laterally outwards, the first portion of light is collimated in a direction parallel to the mounting plate 4, i.e. it is collimated within the horizontal plane in the aircraft frame of reference. The exemplary light rays of the first portion of light hit the first light exit surface 84 in an orthogonal manner and, therefore, pass the first light exit surface 84 without further refraction. For achieving said collimation, the first total internal reflection surface 82 has a parabolic shape in cross-section, as illustrated in FIGS. 3 and 4. The first portion of light encompasses the light output by the plurality of light sources 6 in an angular range of about 45° between the principal light emission directions 60 and 45° laterally outwards thereof.

A second portion of light enters the lens structure 8 from the plurality of light sources 6, reaches the second total internal reflection surface 86, experiences total internal reflection at the second total internal reflection surface 86, and exits the lens structure for a first time at the second light exit surface 88. The second total internal reflection surface 86 is also parabolic. However, the parabolic shape is tilted in such a way with respect to the mounting plate 4 that the exemplary light rays are not collimated parallel to the mounting plate 4, but somewhat angled upwards as compared to the mounting plate 4. The exemplary light rays of the second portion of light experience an additional refraction at the second light exit surface 88. The second portion of light, after passing the second light exit surface 88, re-enters the lens structure 8 at the refractive portion 90. The refractive portion 90 refracts the second portion of light to be parallel with respect to the mounting plate 4. In this way, the second portion of light is also emitted in or close to the horizontal plane of the aircraft in the aircraft frame of reference. The second portion of light encompasses the light output by the plurality of light sources 6 in an angular range of about 30° between the principal light emission directions 60 and 30° laterally inwards thereof.

A third portion of light, emitted by the plurality of light sources 6, enters the lens structure 8 after being emitted by the plurality of light sources 6 and propagates right to the first light exit surface 84. There, the third portion of light is refracted into various angular directions. The third portion of light encompasses the light output by the plurality of light sources 6 in an angular range of about 45° between 45° laterally outwards of the principal light emission directions 60 and parallel to the mounting plate 4.

A fourth portion of light enters the lens structure 8 after being emitted by the plurality of light sources 6 and propagates right to the second light exit surface 88 and the refractive portion 90. There, the fourth portion of light experiences refraction into various angular regions. The fourth portion of light encompasses the light output by the plurality of light sources 6 in an angular range of about 60° between 30° laterally inwards of the principal light emission directions 60 and parallel to the mounting plate 4.

With the given lens structure 8, a highly efficient fulfilling of the FAR requirements for aircraft beacon lights, requiring a high intensity peak in the horizontal plane in the aircraft frame of reference and requiring a decreasing intensity for larger angles with respect to the horizontal plane, can be achieved. The total internal reflection at the first and second total internal reflection surfaces 82, 86 allows for providing the peak in the horizontal plane in a particularly space-efficient and energy-efficient manner. As compared to previous approaches, where complex optical systems, based on metallic reflectors, were used, an FAR-compliant beacon light output may be achieved with up to 80% reduction in beacon light volume and up to 60% reduction in height over the aircraft fuselage. In this way, aerodynamic drag can be reduced, and the exposure to damaging particles and larger structures, such as birds, can be reduced.

Figure 5:
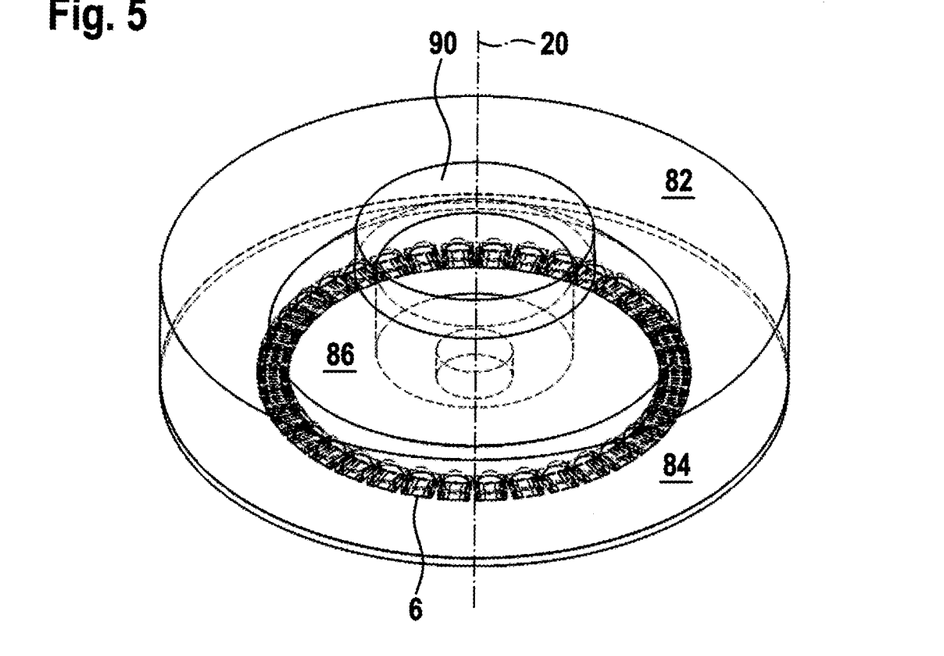
FIG. 5 shows selected components of the aircraft beacon light of FIG. 3 in a perspective view.

FIG. 5 shows the lens structure 8 and the plurality of light sources 6 of the aircraft beacon light of FIGS. 3 and 4 in a three-dimensional, perspective view. FIG. 5 illustrates the rotationally symmetric, annular structure of the lens structure 8, with the first total internal reflection surface 82, the first light exit surface 84, the second total internal reflection surface 86 and the refractive portion 90 all revolving around the axis of symmetry 20.

The plurality of light sources 6 are arranged in a circular manner around the axis of symmetry 20. In the exemplary embodiment of FIGS. 3 to 5, 36 red LEDs 6 are provided around the axis of symmetry 20. The plurality of light sources 6 are arranged next to each other along the circular outline.

It is pointed out that the plurality of light sources 6 may also comprise infrared light sources. For example, every other or every third or every fourth of the plurality of light sources 6 may be an infrared light source. In this way, the aircraft beacon light may be operated both in a visible light mode, emitting flashes of red light, and in a covert mode, emitting flashes of infrared light.

Figure 6:
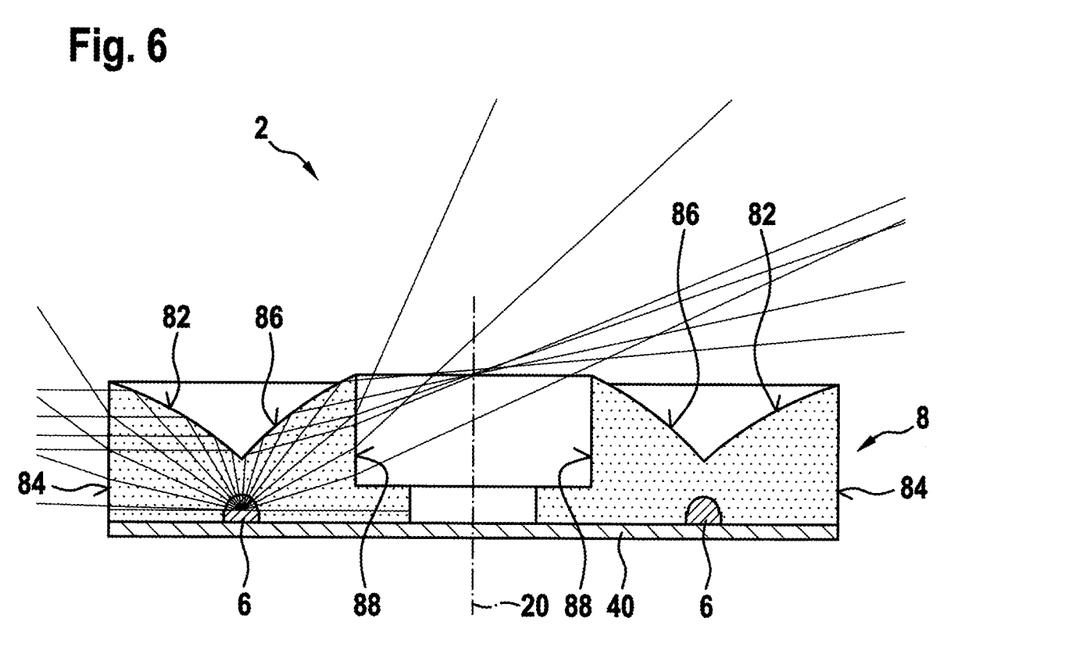
FIG. 6 shows an aircraft beacon light in accordance with another exemplary embodiment of the invention in a cross-sectional view.

FIG. 6 shows an aircraft beacon light 2 in accordance with another exemplary embodiment of the invention. The aircraft beacon light 2 of FIG. 6 is similar to the aircraft beacon light 2, shown throughout FIGS. 3 to 5. Therefore, the description of FIG. 6 focusses on the differences between this embodiment and the embodiment of FIGS. 3 and 5. For the remainder of the features and components, reference is made to the description of FIGS. 3 and 5. Also, for ease of illustration, FIG. 6 only shows the mounting plate 4, the plurality of light sources 6, and the lens structure 8 in a cross-sectional view. The aircraft beacon light 2 of FIG. 6 also has a support structure 12, a lens cover 10, and a control unit 14, as shown in FIG. 3.

The lens structure 8 of the exemplary embodiment of FIG. 6 has a second total internal reflection surface 86 that is different from the second total internal reflection surface 86 of the embodiment of FIGS. 3 to 5. In particular, the second total internal reflection surface 86 of FIG. 6 is not parabolic in cross-section, but has a free-form shape. This free-form shape reflects the second portion of light into various angular directions, with all of those directions, as modified by the second light exit surface 88, leading past the lens structure 8 on the other side of the aircraft beacon light 2. In this way, the second portion of light is used mainly for satisfying FAR requirements at larger angles with respect to the horizontal plane, as compared to the embodiment of FIGS. 3 to 5. With the first portion of light still providing a strong peak in the horizontal plane, it is also possible to satisfy the FAR requirements with the lens structure 8 of FIG. 6.

It is further pointed out that the lens structure 8 of the aircraft beacon light 2 of FIG. 6 does not have a refractive portion 90, as shown in FIGS. 3 to 5. In the absence of this refractive portion 90, laterally inwards reflected light may pass the other side of the lens structure 8 more easily and may thus contribute to a strong light output at small angles with respect to the horizontal plane.

In general, it is pointed out that the first total internal reflection surface does also not have to be parabolic and may have different shapes for achieving the desired total internal reflection. Also, in place of the second total internal reflection surface, other optical structures may be provided for conditioning the second portion of light.

Figure 7:
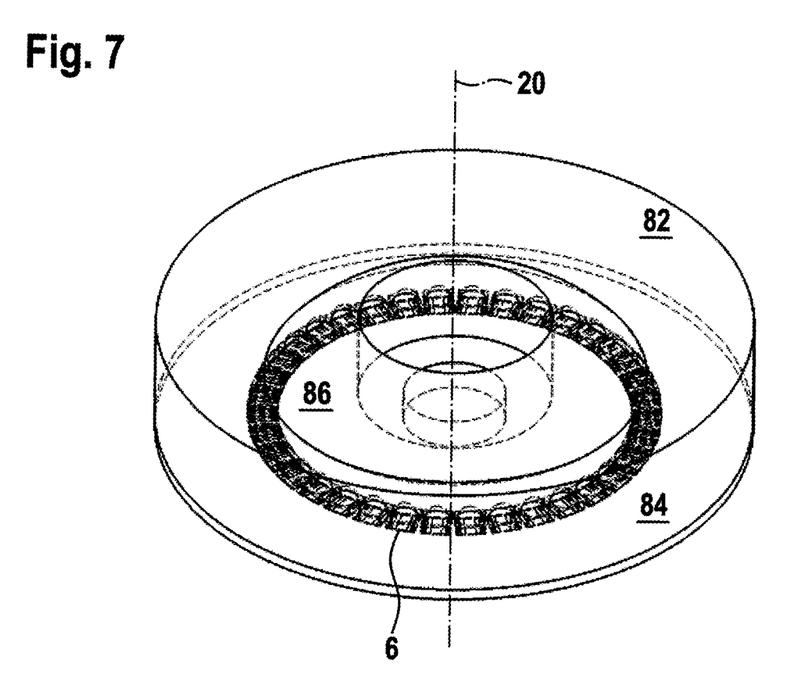
FIG. 7 shows selected components of the aircraft beacon light of FIG. 6 in a perspective view.

FIG. 7 shows the plurality of light sources 6 and the lens structure 8 of FIG. 6 in a three-dimensional, perspective view. Again, FIG. 7 shows the annular structure of the lens structure 8 and the arrangement of the plurality of light sources 6 along a circular outline.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light comprising:
   a mounting plate having a central portion;
   a plurality of light sources arranged on the mounting plate around the central portion and facing away from the mounting plate; and
   a lens structure arranged over the plurality of light sources, wherein the lens structure is configured to reflect a first portion of light emitted by the plurality of light sources laterally outwards via total internal reflection;
   wherein the aircraft beacon light is configured to emit flashes of red light in operation;
   wherein the lens structure comprises a first total internal reflection surface configured to reflect the first portion of light emitted by the plurality of light sources laterally outwards via total internal reflection, wherein the first total internal reflection surface is positioned laterally outwards of the plurality of light sources; and
   wherein the first total internal reflection surface covers an angular range of between 30° and 60°, when seen from the plurality of light sources in cross-section.

2. The aircraft beacon light according to claim 1, wherein the lens structure is a unitary, substantially annular structure.

3. The aircraft beacon light according to claim 1, wherein the lens structure is made from silicone.

4. The aircraft beacon light according to claim 1, wherein the first total internal reflection surface is substantially parabolic in cross-section.

5. The aircraft beacon light according to claim 1, wherein the lens structure is configured to collimate the first portion of light emitted by the plurality of light sources within an angular range of less than 10° with respect to the mounting plate.

6. The aircraft beacon light according to claim 1, wherein the plurality of light sources are arranged on the mounting plate in a substantially rotationally symmetric manner or wherein the lens structure is substantially rotationally symmetric.

7. The aircraft beacon light according to claim 1, further comprising a lens cover arranged over the plurality of light sources and the lens structure, wherein the light paths from the plurality of light sources to the lens cover are free of metallic reflectors.

8. The aircraft beacon light according to claim 1, wherein the plurality of light sources comprise a plurality of red light sources.

9. The aircraft beacon light according to claim 8, wherein the plurality of red light sources are a plurality of red LEDs.

10. The aircraft beacon light according to claim 1, wherein the plurality of light sources comprise a plurality of infrared light sources.

11. The aircraft beacon light according to claim 10, wherein the plurality of infrared light sources are a plurality of infrared LEDs.

12. The aircraft beacon light according to claim 1, wherein the lens structure is overmolded over the plurality of light sources.

13. An aircraft comprising:
    at least one aircraft beacon light in accordance with claim 1.

14. The aircraft according to claim 13, wherein the at least one beacon light comprises an upper aircraft beacon light mounted to a top portion of a fuselage of the aircraft, and a lower aircraft beacon light mounted to a bottom portion of the fuselage of the aircraft.

15. The aircraft according to claim 1, wherein the lens structure comprises a second total internal reflection surface configured to reflect a second portion of light emitted by the plurality of light sources laterally inwards via total internal reflection, wherein the second total internal reflection surface is positioned laterally inwards of the plurality of light sources.

16. The aircraft beacon light according to claim 15, wherein the second total internal reflection surface is configured to direct the second portion of light past the central portion of the mounting plate and past the lens structure and/or towards a refractive portion of the lens structure.

17. An aircraft beacon light comprising:
a mounting plate having a central portion;
a plurality of light sources arranged on the mounting plate around the central portion and facing away from the mounting plate; and
a lens structure arranged over the plurality of light sources, wherein the lens structure is configured to reflect a first portion of light emitted by the plurality of light sources laterally outwards via total internal reflection;
wherein the aircraft beacon light is configured to emit flashes of red light in operation;
wherein the lens structure comprises a second total internal reflection surface configured to reflect a second portion of light emitted by the plurality of light sources laterally inwards via total internal reflection, wherein the second total internal reflection surface is positioned laterally inwards of the plurality of light sources.

18. The aircraft beacon light according to claim 17, wherein the second total internal reflection surface is configured to direct the second portion of light past the central portion of the mounting plate and past the lens structure and/or towards a refractive portion of the lens structure.

19. An aircraft comprising:
first and second aircraft beacon lights,
wherein the first aircraft beacon light is mounted to a top portion of a fuselage of the aircraft,
wherein the second aircraft beacon light is mounted to a bottom portion of a fuselage of the aircraft;
wherein each of the first and second aircraft beacon lights emits flashes of red light in operation and includes:
a mounting plate having a central portion;
a plurality of light sources arranged on the mounting plate around the central portion and facing away from the mounting plate; and
a lens structure arranged over the plurality of light sources, wherein the lens structure is configured to reflect a first portion of light emitted by the plurality of light sources laterally outwards via total internal reflection;
wherein the lens structure comprises a first total internal reflection surface configured to reflect the first portion of light emitted by the plurality of light sources laterally outwards via total internal reflection, wherein the first total internal reflection surface is positioned laterally outwards of the plurality of light sources; and
wherein the first total internal reflection surface covers an angular range of between 30° and 60°, when seen from the plurality of light sources in cross-section.

* * * * *